D. W. WOOD.
STOP MECHANISM.
APPLICATION FILED JAN. 4, 1917.
1,245,653.
Patented Nov. 6, 1917.
3 SHEETS—SHEET 3.
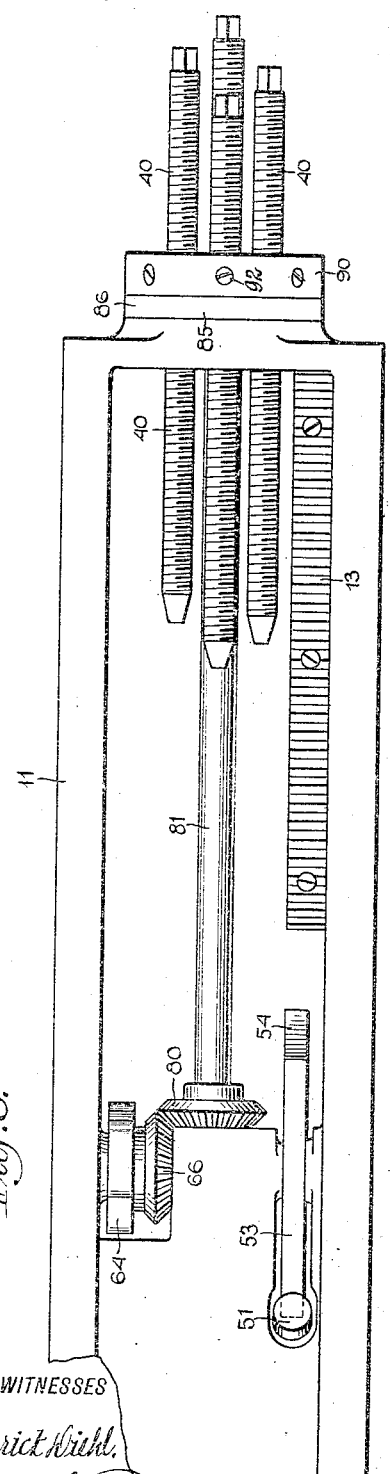
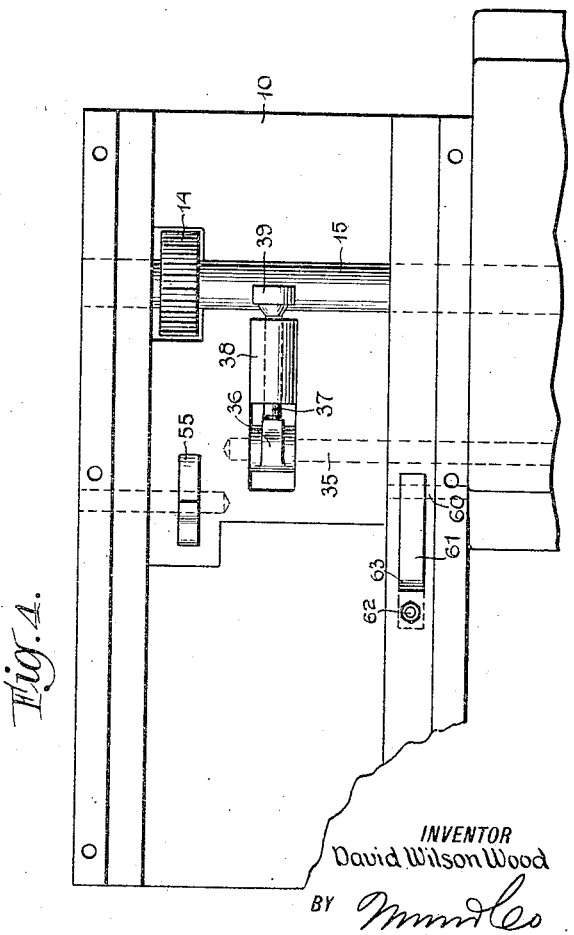
WITNESSES
INVENTOR
David Wilson Wood
BY
ATTORNEYS

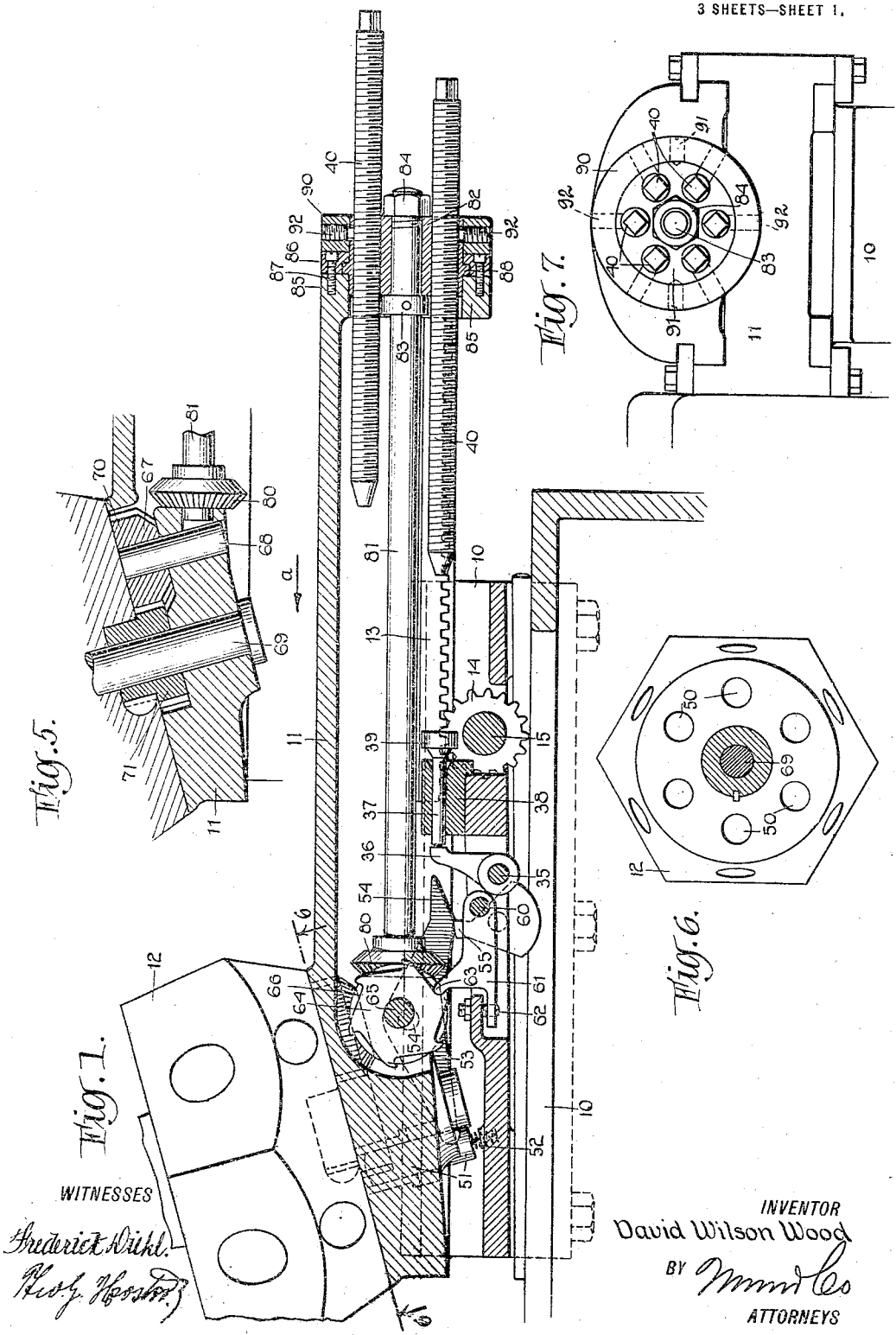

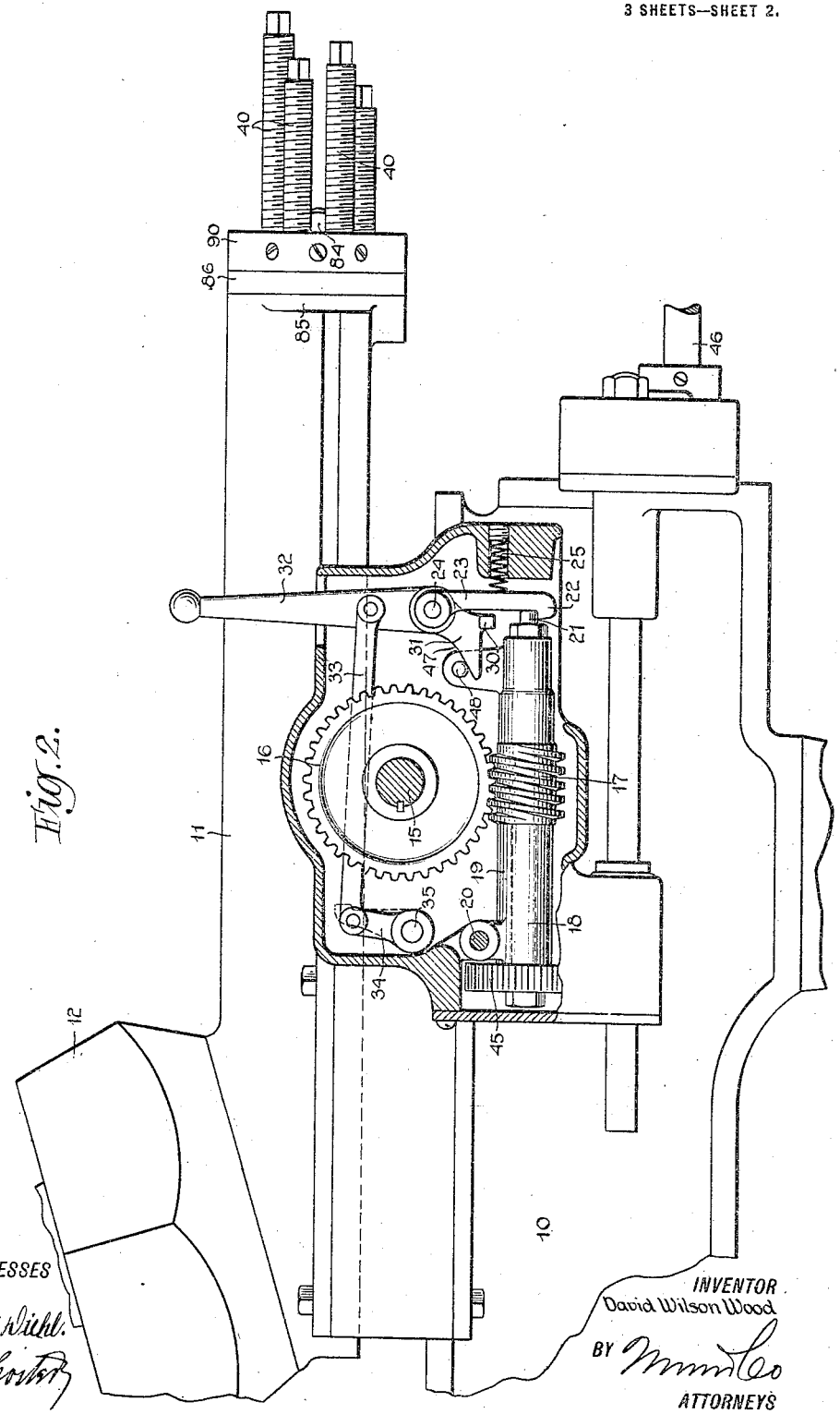

UNITED STATES PATENT OFFICE.

DAVID WILSON WOOD, OF BRAZIL, INDIANA.

STOP MECHANISM.

1,245,653.  Specification of Letters Patent.  Patented Nov. 6, 1917.

Application filed January 4, 1917. Serial No. 140,613.

*To all whom it may concern:*

Be it known that I, DAVID WILSON WOOD, a citizen of the United States, and a resident of Brazil, in the county of Clay and State of Indiana, have invented a new and Improved Stop Mechanism, of which the following is a full, clear, and exact description.

The invention relates to lathes, drill presses, milling machines and similar machines using a turret head and stop rods.

The object of the invention is to provide a new and improved stop mechanism for machines of the type referred to and arranged to insure automatically a positive stopping of the turret slide and its turret head according to the predetermined feed intended to be given to the turret head. Another object is to positively unlock the turret head immediately prior to turning it in unison with the revoluble head carrying the stop rods. Another object is to permit of turning the stop rod by hand and independent of the turret head in order to move the stops in correct relation to the turret head in case the latter had been removed and then replaced.

In order to produce the desired result, use is made of a bearing for the driving worm shaft pivoted at one end, a resetting hand lever provided with a supporting member for supporting the free end of the said bearing, a tripping shaft having two arms, of which one is connected by a link with the said resetting lever and the other is adapted to be engaged by a tripping pin mounted to slide and adapted to be engaged by the stop rod in active position at the time. Use is also made of a locking pin engaging one of a series of holes in the bottom of the turret head, a lever engaging the said pin and fulcrumed on the turret slide, a fixed cam adapted to be engaged by the said lever to withdraw the locking pin from the turret head, a fixed tooth, a toothed wheel adapted to engage the said fixed tooth immediately after the locking pin is withdrawn, and gearing turning with the said toothed wheel and connected with the turret head and with the head carrying the stop rods, to rotate the turret head and the stop rod head in unison.

A practical embodiment of the invention is represented in the accompanying drawings forming a part of this specification, in which similar characters of reference indicate corresponding parts in all the views.

Figure 1 is a longitudinal sectional elevation of the stop mechanism as applied to a turret lathe;

Fig. 2 is a similar view of the same and showing more particularly the mechanism for moving the worm out or into gear with the worm wheel connected with the slide to reciprocate the same;

Fig. 3 is an inverted plan view of the turret slide;

Fig. 4 is a plan view of the bed of the lathe or other machine on which the stop mechanism is applied;

Fig. 5 is a sectional side elevation of the turret head mounted to turn on the turret slide;

Fig. 6 is an inverted sectional plan view of the turret head on the line 6—6 of Fig. 1; and Fig. 7 is a rear end elevation of the machine bed, the turret slide and the head carrying the stop rods.

On the bed 10 of the lathe or other machine is mounted to slide a turret slide 11 on which is mounted to turn the tilted turret head 12 adapted to carry a plurality of tools in the usual manner. In order to impart a forward and backward sliding movement to the turret slide 11 use is made of a rack 13 attached to the turret slide 11 and extending lengthwise thereof. A pinion 14 is in mesh with the rack 13 and is secured on a transversely extending shaft 15 journaled in suitable bearings arranged on the bed 10. On the shaft 15 is secured a worm wheel 16 (see Fig. 2) in mesh with a worm 17 secured on a worm shaft 18 journaled in a bearing 19 fulcrumed on a transverse pivot 20 held on the bed 10. The free end of the bearing 19 is provided with a pin 21 normally resting on the lower end 22 of a supporting member 23 preferably in the form of a link hung loosely on a pivot 24 mounted on the bed 10. A spring 25 presses the supporting member 23 to hold the latter in position for supporting the pin 21 of the bearing 19 so that the worm 17 is normally in mesh with its worm wheel 16. The supporting member 23 is adapted to be engaged by a lug 30 held on the lower end 31 of a resetting lever 32 fulcrumed on the pivot 24 and extending upwardly within convenient reach of the operator in charge of the lathe.

The resetting lever 32 is connected by a link 33 with an arm 34 secured on a tripping shaft 35 extending transversely and journaled in suitable bearing arranged on the bed 10. On the shaft 35 is secured a second arm 36 (see Fig. 1) adapted to be engaged by the forward end of a pin 37 mounted to slide lengthwise in a bearing 38 attached to or forming part of the bed 10. The rear end of the pin 37 is provided with a head 39 adapted to be engaged by any one of the stop rods 40 in active position at the time. The worm shaft 18 is provided with a gear wheel 45 connected in the usual manner with the feed shaft 46 of the lathe or other machine on which the stop mechanism is used so that the worm shaft 18 is rotated in either direction in the usual manner.

When the several parts are in the position shown in Figs. 1 and 2, and the slide 11 is caused to slide forward and backward in the direction of the arrow $a$ then the corresponding tool in the turret head 12 is fed to the work and when this tool has accomplished its function then the corresponding stop rod 40 moves with its forward end in engagement with the head 39 of the pin 37 to move the latter forward in its bearing 38. The forward movement given to the pin 37 causes the forward swinging of the arm 36 whereby the tripping shaft 35 is turned and its other arm 34 pulls on the link 33 whereby a forward swinging movement is given to the resetting lever 32. The movement given to the lever 32 causes the lug 30 to move in engagement with the spring-pressed supporting member 23 whereby the latter is swung to the right and out of engagement with the pin 21 to allow the bearing 19 to swing downward by its own weight so that the worm 17 moves out of mesh with the worm wheel 16. When this takes place further forward feeding of the turret slide 11 in the direction of the arrow $a$ ceases although the worm shaft 18 is still rotating. After the worm shaft 18 is reversed the operator imparts a return movement to the resetting lever 32 which latter is provided at its lower end 31 with an incline 47 engaged by a pin 48 held on the free end of the bearing 19. It is understood that during the automatic swinging movement of the resetting lever 32 to the left as previously explained the pin 48 travels down the incline 47 and when the resetting lever 32 is swung to the right by the operator then the incline 47 acts on the pin 48 whereby the bearing 19 is swung upward and the worm 17 is reëngaged with the worm wheel 16. As the worm wheel 17 now rotates in the reverse direction it is evident that a return sliding movement is given to the turret slide 11 in the inverse direction of the arrow $a$.

It is understood that the shaft 15 extends to the front of the machine and is provided at this end with the usual wheel or handle (not shown) to permit the operator to turn the shaft 15 whenever it is desired to feed the turret slide 11 forward or backward by hand for any reason whatever.

The turret head 12 is provided at its under side with a series of apertures 50 arranged in a circle (see Fig. 6) and adapted to be successively engaged by a locking pin 51 mounted to slide in a suitable bearing on the slide 11 and pressed at its bottom by a spring 52 to normally hold the pin 51 in engagement with one of the apertures 50. The pin 51 is engaged by the forward end of a lever 53 fulcrumed at 54 on the slide 11, and the said lever 53 is provided at its rear end with an inclined cam 54 adapted to engage a member 55 fixed on the bed 10. The fixed member 55 is so arranged that when the turret slide 11 moves into rearward position then the cam 54 of the lever 53 engages the member 55 whereby a swinging movement is given to the lever 53 and the locking pin 51 is withdrawn from the corresponding aperture 50 of the turret head 12 thus unlocking the latter. Immediately after the turret head 12 is unlocked a turning movement is given to the turret head and for this purpose the following arrangement is made: On the bed 10 is arranged a pivot 60 on which is fulcrumed an arm 61 engaged by a screw 62 held on the bed 10 for adjusting the arm 61 in an up and down direction. The arm 61 is provided with an upwardly and forwardly extending tooth 63 adapted to successively engage the teeth of a toothed wheel 64 provided with as many teeth as the turret head 12 is provided with tools. The toothed wheel 64 is secured on a transverse shaft 65 journaled in suitable bearings arranged on the turret slide 11, and on the said shaft 65 is secured a bevel gear wheel 66 in mesh with a bevel gear wheel 67 mounted to turn on a shaft 68 journaled in suitable bearings arranged on the turret slide 11, as plainly indicated in Fig. 5. The axis of the shaft 68 extends parallel to the pivot 69 of the turret head 12 and on the bevel gear wheel 67 is secured or formed a gear wheel 70 in mesh with a gear wheel 71 attached to the under side of the turret head 12. When the turret slide 11 moves into rearmost position then the toothed wheel 64 moves in engagement with the fixed tooth 63 immediately after the lock-pin 51 has been withdrawn, as above explained, and then a turning movement is given to the toothed wheel 64 whereby the shaft 65 is rotated and with it the bevel gear wheel 66. The rotary motion of the gear wheel 66 rotates the gear wheels 67, 70 and 71 whereby the turret head 12 is turned a distance to move another tool into active position for the next following operation. It is understood that by adjusting the arm 61 up or down the tooth 63 can be moved in proper relation relative to the tooth of the toothed wheel 64 to insure proper turning of the turret head 12, as above explained, and at the time the slide 11 moves into final rearmost position.

The bevel gear wheel 66 above described is also in mesh with a bevel gear wheel 80 attached to the forward end of a shaft 81 carrying the head 82 in which the stop rods 40 are screwed. The head 82 is clamped between a collar 83 secured on the shaft 81 and a nut 84 screwing on the outer end of the shaft 81. The head 82 is mounted to turn in a bearing, part of which is formed in the outer end of the slide 11 as indicated at 85, and the other part of the bearing is in the form of a ring 86 fastened by screws 87 to the bearing part 85. The peripheral face of the head 82 is provided with an annular rib 88 fitting into a corresponding rabbet formed in the ring 86. On the right-hand end of the head 82 is fitted a ring 90 fastened by set screws 91 (see Fig. 7) to the head 82, and in the ring 90 screw set screws 92 against the stop rods 40 so as to lock the latter in place after proper adjustment of the same has been made. When the machine is running, as previously explained, and a turning movement is given to the toothed wheel 64 then the shaft 81 is turned owing to its gear wheel 80 being in mesh with the gear wheel 66, and the rotary motion of the shaft 81 causes a turning of the head 82 whereby another stop rod 40 is moved into active position.

It will be noticed that in case the turret head 12 is removed from the slide 11 for repairs or other purposes and is then replaced it may be necessary to reset the stop rod head 82, and for this purpose it is only necessary to loosen the nut 84 to permit of turning the head 82 in its bearings 85 and 86 until the stops are in proper relation relative to the tool in the turret head 12.

From the foregoing it will be seen that by the arrangement described a positive stopping of the turret slide is automatically had as soon as the corresponding tool in the turret head 12 has perfomed its work. It will also be noticed that when the turret slide 11 moves back into rearmost position the turret head 12 is automatically unlocked by withdrawing the pin 51 from the corresponding aperture 50 and immediately thereafter a turning movement is given to the toothed wheel 64 by the latter coming in contact with the fixed tooth 63 so that the turret head 12 is turned the desired distance and in unison with it turns the head 82 carrying the stop rods 40 so that the next tool and the corresponding stop rod 40 move into active position.

Having thus described my invention, I claim as new and desire to secure by Letters Patent:

1. In a stop mechanism of the class described, a turret slide stop head revolubly mounted at its front end and provided with stops adjustably held therein, a tripping pin longitudinally slidable in a fixed bearing and adapted to be engaged by one of the stops in active position at the time, a tripping shaft carrying two arms, of which one is adapted to be engaged by the said pin, a resetting lever, a link connecting the said resetting lever with the second arm on the said shaft, a driven worm, a bearing for the said worm and pivoted at one end, a worm wheel in mesh with the said worm and geared with the said turret slide, and a supporting member controlled by the said resetting lever and normally supporting the free end of the said bearing.

2. In a stop mechanism of the class described, a turret slide having a revoluble stop head provided with stops, a tripping pin slidable in a fixed bearing and adapted to be engaged by one of the stops in active position at the time, a tripping shaft carrying two arms, of which one is adapted to be engaged by the said pin, a resetting lever, a link connecting the said resetting lever with the second arm on the said shaft, the said resetting lever having an incline, a spring-pressed pivoted supporting member adapted to be engaged by the said resetting lever, a bearing pivoted at one end on the slide and seated at its other end on the said incline and the supporting member, a driven worm shaft journaled in the said bearing and carrying a worm, a worm wheel in mesh with the said worm, a worm wheel shaft carrying the said worm wheel and journaled on the slide, a pinion on the said worm wheel shaft, and a rack on the said slide and engaged by the said pinion.

3. In a stop mechanism of the class described, a bed, a turret slide mounted thereon and carrying a turret head, a stop head revolubly mounted at the front end of said slide and carrying stops, a locking pin engaging the said turret head to hold the latter against turning, a lever controlling the said pin, a fixed member adapted to engage the said lever on the return movement of the slide to withdraw the said locking pin from the turret head, an adjustable arm fulcrumed on the bed, a fixed tooth carried by said arm, a toothed wheel adapted to engage the said fixed tooth immediately after the said locking pin is withdrawn, a shaft journaled on the said turret slide and carrying the said toothed wheel, and gearing connecting the said shaft with the said turret head and with the stop head to rotate the same in unison.

4. In a stop mechanism for turret machines, a turret slide, a turret head mounted to turn on the said turret slide, a stop head mounted to turn in the said slide and provided with an annular exterior shoulder, a shaft provided with a collar and a nut and between which the said head is clamped, a bearing ring attached to the said slide and engaging the said head and its shoulder, a collar on the said head and abutting against the said bearing ring, and set screws screwing in the said collar and against the stops held in the stop head.

5. In a stop mechanism of the class described, a turret slide carrying a turret head, a stop head revolubly mounted at the front end of said slide and carrying stops, a locking pin engaging said turret head to hold the latter against turning, a lever controlling said pin, the forward end of said lever being beveled, a rigid member adapted to engage the beveled end of said lever on return movement of the slide to withdraw said locking pin from the turret head, an adjustable arm, a tooth carried by said arm, a toothed wheel adapted to engage the said tooth immediately subsequent to withdrawal of locking pin, a shaft on the turret slide and carrying said toothed wheel, and gear connections between said shaft and turret head and with the stop head to cause the same to rotate in unison.

DAVID WILSON WOOD.

Copies of this patent may be obtained for five cents each, by addressing the "Commissioner of Patents, Washington, D. C."